Oct. 15, 1957     R. J. BROWN     2,809,590
ELECTRIC MOTOR DRIVEN PUMP

Filed Jan. 29, 1954     2 Sheets-Sheet 1

ROBERT J. BROWN
INVENTOR.

BY *Jesse P. Whann*

Attorney

ROBERT J. BROWN
INVENTOR.

BY *Jesse P. Whann*

Attorney

United States Patent Office 2,809,590
Patented Oct. 15, 1957

2,809,590

ELECTRIC MOTOR DRIVEN PUMP

Robert J. Brown, Huntington Park, Calif.

Application January 29, 1954, Serial No. 406,959

12 Claims. (Cl. 103—87)

My invention relates to an electric motor driven pump unit of simplified and compact form especially adapted for the pumping of liquids.

It is an object of the invention to provide a pump unit including a centrifugal pump and electric motor drive therefor wherein the difficulties attendant upon the use of thrust bearings are avoided, and wherein proper positioning of the pump impeller in the impeller chamber of the pumping device is automatically obtained. A special feature of the invention is that there is no requirement for packing glands around the pump shaft and therefore in the use of the pump unit there is no requirement for adjustment and replacement of shaft sealing means. In the present construction, which avoids the use of packing glands around the pump shaft injuries to the pump mechanism resulting from leaking of glands is avoided.

It is a further object of the invention to provide an electric motor driven centrifugal pump unit arranged to be connected to and supported by the lower end of a discharge pipe, thereby making it possible to use the discharge pipe as a means for lowering and supporting the pump submerged in the liquid which is to be pumped, for example in a well or in a drum or other container.

It is an object of the invention to eliminate ordinary thrust bearings and their difficulties by use of a fully automatic hydraulic thrust bearing means actuated by pressure differential created by the pump impeller when it is in operation.

It is a further object of the invention to provide a pump of the character referred to in the foregoing having therein a balancing disc mounted on the shaft and internal pressure balancing passages for bringing fluid pressure differential to the balancing disc.

It is a further object of the invention to provide an electric motor driven centrifugal pump unit having therein a motor driven shaft provided with a longitudinal opening for carrying pressure differential to the balancing disc, and a further object of the invention is to provide a pump of this character wherein a balancing disc is mounted on one extremity of the shaft so that it may be inspected and/or serviced by removal of a cover plate at the corresponding end of the unit shell.

Further objects and advantages of the invention may be brought out in the following part of the specification wherein I have described comparatively small details of my invention for the purpose of giving a complete disclosure, without the intention, however, of limiting the scope of the invention which is set forth in the appended claims.

Referring to the accompanying drawings which are for illustrative purposes only:

Figure 1:
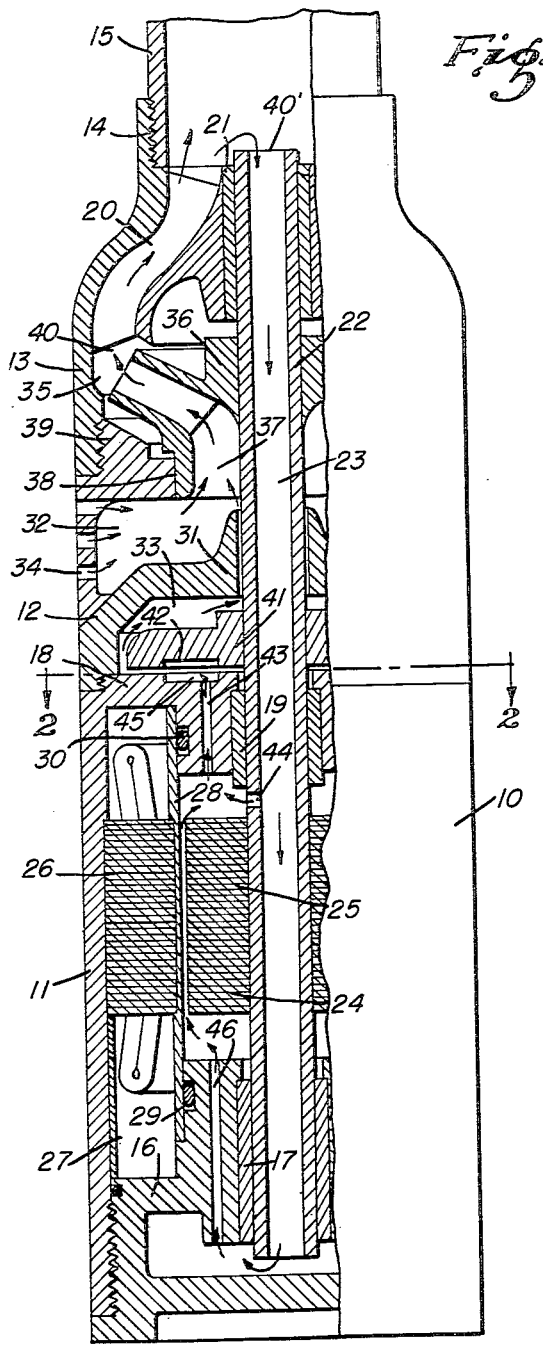
Fig. 1 is a partly sectioned view of a preferred embodiment of my invention adapted to be connected to the end of a discharge pipe.
Figure 2:
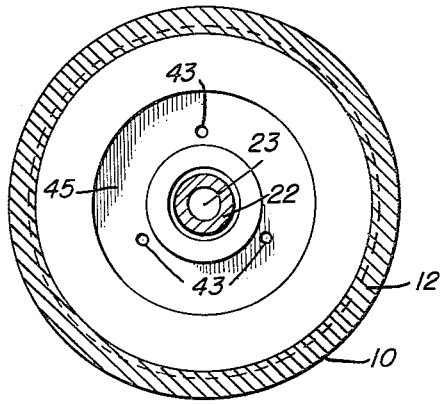
Fig. 2 is a cross-sectional view taken as indicated by the line 2—2 of Fig. 1.

The embodiment of the invention shown in Fig. 1 includes a shell 10 comprising a lower cylinder 11, an inlet section 12 of the same external diameter as the lower shell member 11, and an upper or outlet section 13 having a threaded axial opening 14 whereby it may be connected to the threaded end of a discharge pipe 15. An annular wall 16, arranged to be inserted into the lower end of the cylinder 11, carries an axial shaft bearing 17. The upper end of the cylinder 11 has an annular wall 18 supporting a shaft bearing 19, and the outlet section 13 includes a diffuser section 20 which supports an upper shaft bearing 21 in axial alignment with the bearings 17 and 19.

A shaft 22, having a longitudinal opening 23 therein, is supported in the bearings 17, 19 and 21. This shaft 22 is adapted to be rotated by a motor 24 located in the cylinder 11, this motor having a rotor 25 which is fixed on the shaft 22 between the bearings 17 and a stator 26 disposed in a sealed chamber 27 of annular form located between the walls 16 and 18, the stator 26 being mounted on a cylindrical wall 28 which surrounds the rotor 25 and which is sealed by sealing means 29 and 30 of the O-ring type carried by the axially extended portions of the walls 16 and 18.

The middle section 12 has therein a radial wall 31 surrounding an intermediate portion of the shaft 22 and dividing the interior of the intermediate section 12 into an inlet space 32 and a balancing chamber 33. The inlet space 32 communicates with the exterior of the shell 10 through a plurality of openings 34. The lower portion of the upper section 13 comprises an impeller chamber 35 in which a centrifugal impeller 36 is located. This impeller 36 has an inlet portion 37 which communicates with the inlet space 32 through an opening 38 formed in the upper wall 39 of the middle section 12. The upper or outlet section 13 of the shell 10 also includes an outlet space 40 which receives fluid discharged by the impeller 36. For purpose of identification, it may be said that the outlet space 40 also includes the diffuser passages 20 and the space 40' at the upper end of the shaft 22 which receives the pump fluid under pressure from the impeller 36 and the diffuser passages 20.

A balancing disc 41 is fixed on the shaft 22 and is located in the balancing chamber 33. This balancing disc 41 has a diameter greater than the diameter of the inlet portion 37 of the impeller 36 or the opening 38 in the wall 39. In other words, the area of the balancing disc 41 is greater than the unbalanced inlet area of the impeller 36. The balancing disc 41 has a working face 42 confronting the annular wall 18. The lower or working face 42 of the balancing disc 41 is faced in a direction opposite to that of the impeller 36. The impeller 36 is regarded as being faced upwardly for the reason that it receives the fluid to be pumped into its lower end and discharges the same in a generally upward direction. The working face 42 of the disc 41 faces downwardly. It is therefore regarded as being faced in a direction opposite to that in which the impeller 36 is faced.

The pump unit disclosed in Fig. 1 has passage means for applying fluid pressure from the outlet space 40 to the working space 42 of the balancing disc 41 so that this fluid pressure will act against the fluid pressure differential in the impeller chamber 35 which sets up an axially directed thrust tending to move the impeller 36 and the shaft 22 downwardly. The annular wall 18 has an axial passage 43 therethrough and the shaft 22 is provided with a radial opening 44 so that fluid under pressure from the outlet space 40 may pass through the opening 44 and the passage 43 into the space 45 between the balancing disc 41 and the annular wall 18. The pressure of this fluid against the working face 42 of the disc 41 lifts the disc so that the fluid may pass radially outwardly across the peripheral portion of the working face of the disc, thereby limiting the pressure applied upwardly against the working face 42 of the disc 41 to a value which will hold the parts 41 and 18 in spaced relation, the fluid which engages the working face 42 of the disc 41 then acting as a thrust bearing to support the shaft 22, the rotor 25 and the impeller 36.

In Fig. 1, I have also shown at least one axial passage 46 through the axially elongated portion of the wall 16 adjacent the lower end of the cylinder 11 so that a portion of the pumped fluid may pass from the lower end of the opening 23 of the shaft 22 upwardly around the lower bearing 17 and across the rotor 25 and stator 26 to cool the same. It will be perceived that no thrust bearing means other than the balancing disc 41 and the annular wall 18 are required, and that setting of the pump into operation immediately effects automatic operation of the balancing means.

Figure 3:
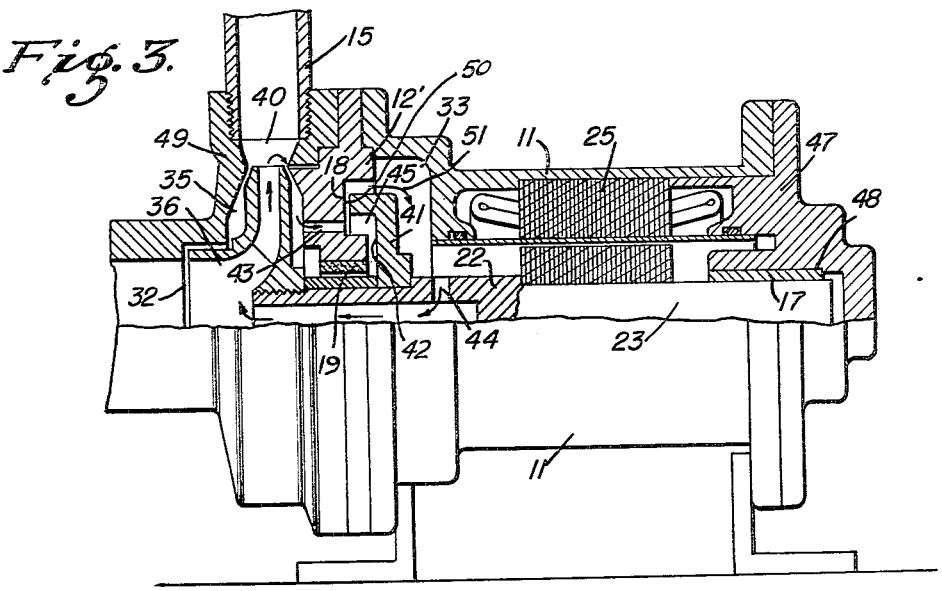
Fig. 3 is a partly sectioned view showing an alternative form of the invention.

In the form of the invention shown in Fig. 3, the motor 25 is located in a shell member 11 which is closed at its rear end by a plate 47 having a bore 48 which supports a shaft bearing 17. At the opposite end of the shell member 11 there is a plate 12' defining a chamber 33 and also carrying a shaft bearing 19. An impeller housing 49 is secured adjacent the outer face of the plate 12' and in conjunction therewith defines an impeller chamber 35 having an inlet space 32 and an outlet space 40 arranged for connection to discharge piping 15.

A balancing disc 41, disposed at the chamber 33, is fixed on the shaft 22 in a position with its working face 42 confronting the annular wall portion 18 of the plate 12'. At least one passage 43 is extended through the annular wall portion 18 so as to connect the outlet space 40 of the impeller chamber with the space 45 between the wall portion 12' and the balancing disc 41.

The diameter of the balancing disc 41 is greater than the diameter of the impeller inlet and, therefore, fluid pressure transmitted from the outlet space 40 through the passage 43 into the space 45 will act against the balancing disc 41 to move the same leftwardly so that it will lie in spaced relation to the annular wall portion 18, the leakage of fluid through the narrow annular gap 50 bleeding the pressure in the space 45 down to the value required to effect the balancing function. The shaft 22 has a longitudinal opening 23 which communicates with the chamber 33 through a radial opening 44 in the shaft 22, to provide a passage for conducting leakage fluid from the gap 50 to the inlet space 32 as indicated by arrows 51.

Figure 4:
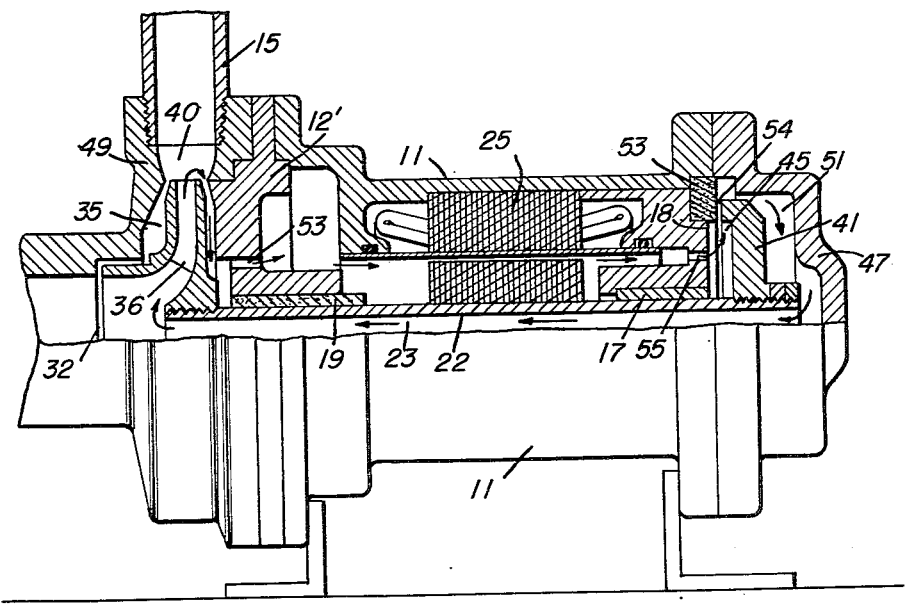
Fig. 4 is a partly sectioned elevational view showing a form of the invention wherein the balancing disc is mounted on the end of the tubular shaft opposite from the pump impeller.

A form of the invention shown in Fig. 4 has a cylindrical shell 11 with shaft bearings 17 and 19 therein to rotatably support a shaft 22 having a longitudinal opening from end-to-end thereof. An impeller chamber 35 is formed at the front end of the device by a plate 12' and a housing 49. An impeller 36, mounted on the front end of the shaft 22 draws fluid from the inlet space 32 and discharges the same under pressure into the outlet space 40 of the impeller chamber 35.

A cover plate 47 secured to the rightward end of the shell 11, defines a chamber 51 in which a balancing disc 41 is located. This balancing disc is secured to the rear end of the shaft 22 in confronting relation to an annular wall 18. A ring 53 of wear resistant, low friction material, such as a rubber compound or a plastic of the nature of Teflon, is disposed around the annular wall 18 in a position to confront the narrow annular face 54 adjacent the periphery of the balancing disc 41.

A passage 53 through the plate 12' connects the outlet space 40 of the impeller chamber with the interior of the shell 11 so that fluid pressure may pass rightwardly through the motor and through a passage 55 into the space 45 between the balancing disc 41 and the annular wall 18, to move the plate 41 rightwardly until leakage from the space 45 across the annular face 54 limits the pressure acting rightwardly against the disc 41 to a pressure value corresponding to the pressure acting leftwardly against the rightward face of the impeller 36. Removal of the plate 47 renders the disc 41 immediately accessible, and removal of the disc 41 from the end of the shaft 22 enables replacement of the wear ring 53 without need for disturbing the pump end of the unit.

I claim:

1. In an electric motor driven pump, the combination of: a shell having bearings therein and inlet and outlet spaces for the fluid to be pumped; a shaft extending in said bearings; a motor in the shell to drive said shaft; an impeller on the shaft for moving fluid from said inlet space to said outlet space, having a high pressure end and a low pressure end; a balancing disc having a working face and a back face fixed on said shaft with its working face facing in opposite direction to the high pressure end of said impeller; an annular wall supported in said shell in a position facing said working face of said balancing disc; and walls forming a passage within said shell connecting said outlet space with the space between said balancing disc and said annular wall, said back face of said working disc being exposed to a pressure lower than the pressure in said outlet space so that pressure of fluid in said space between said balancing disc and said annular wall will hold said balancing disc in spaced relation to said annular wall.

2. In an electric motor driven pump, the combination of: a shell having bearings therein and inlet and outlet spaces for the fluid to be pumped; a shaft extending in said bearings, said shaft having a longitudinal opening therein; a motor in the shell to drive said shaft; an impeller on the shaft for moving fluid from said inlet space to said outlet space, having a high pressure end and a low pressure end; a balancing disc having a working face and a back face fixed on said shaft with its working face facing in opposite direction to the high pressure end of said impeller; an annular wall supported in said shell in a position facing said working face of said balancing disc; walls forming a passage within said shell connecting said outlet space with the space between said balancing disc and said annular wall; and wall means forming a passage connecting said space adjacent the back of said balancing disc with said inlet space, so that pressure of fluid in said space between said balancing disc and said annular wall will hold said balancing disc in spaced relation to said annular wall, one of said passages being connected to said longitudinal opening of said shaft.

3. An electric motor and pump combination as defined in claim 1 wherein said balancing device is removably mounted on one end of said shaft and said shell has a removable plate at the corresponding end thereof providing access to said balancing disc.

4. A motor driven pump as defined in claim 2 wherein said opening extends from end-to-end of said shaft and wherein said balancing disc and said annular wall are disposed at one end of said shaft.

5. In an electric motor driven pump, the combination of: a shell having bearings therein and inlet and outlet spaces for the fluid to be pumped; a shaft extending in said bearings; a motor in the shell to drive said shaft; an impeller mounted on said shaft between said inlet and outlet spaces for moving fluid from said inlet space to said outlet space, having a high pressure end and a low pressure end; a balancing disc having a working face and a back face fixed on said shaft, on the opposite side of said inlet space from said impeller, with its working face facing in opposite direction to the high pressure end of said impeller; an annular wall supported in said shell in a position facing said working face of said balancing disc; and walls forming a passage within said shell connecting said outlet space with the space between said balancing disc and said annular wall, said back face of said working disc being exposed to a pressure lower than the pressure in said outlet space so that pressure of fluid in said space between said balancing disc and said annular wall will hold said balancing disc in spaced relation to said annular wall.

6. In an electric motor driven pump, the combination of: a shell having bearings therein and inlet and outlet spaces for the fluid to be pumped; a shaft extending in said bearings, said shaft having a longitudinal opening therein; a motor in the shell to drive said shaft; an impeller mounted on said shaft between said inlet and outlet spaces for moving fluid from said inlet space to said outlet space, having a high pressure end and a low pressure end; a balancing disc having a working face and a back face fixed on said shaft, on the opposite side of said inlet space from said impeller, with its working face facing in opposite direction to the high pressure end of said impeller; an annular wall supported in said shell in a position facing said working face of said balancing disc; walls forming a passage within said shell connecting said outlet space with the space between said balancing disc and said annular wall; and wall means forming a passage connecting said space adjacent the back of said balancing disc with said inlet space, so that pressure of fluid in said space between said balancing disc and said annular wall will hold said balancing disc in spaced relation to said annular wall, one of said passages being connected to said longitudinal opening of said shaft.

7. In an electric motor driven pump adapted to be connected to the lower end of a discharge pipe: a shell arranged to be connected to the lower end of said pipe, said shell having bearings therein, and outlet space connected to the lower end of said pipe and an inlet space below said outlet space communicating with the exterior of said shell; a shaft extending in said bearings; a motor in said shell below said inlet space for driving said shaft; an impeller on the shaft between said inlet and outlet spaces for moving fluid from said inlet space to said outlet space, having a high pressure end and a low pressure end; a balancing disc fixed on said shaft below said inlet space, said balancing disc having a working face and a back face, said working face being directed away from said inlet space; an annular wall supported in said shell in a position facing said working face of said balancing disc; and walls forming a passage within said shell connecting said outlet space with the space between said balancing disc and said annular wall, said back space of said balancing disc being exposed to fluid pressure from said inlet space, so that pressure of fluid in said space between said balancing disc and said annular wall will hold said balancing disc in spaced relation to said annular wall.

8. In an electric motor driven pump adapted to be connected to the lower end of a discharge pipe: a shell arranged to be connected to the lower end of said pipe, said shell having bearings therein, an outlet space connected to the lower end of said pipe and an inlet space below said outlet space communicating with the exterior of said shell; a shaft extending in said bearings, said shaft having a longitudinal opening communicating with said outlet space; a motor in said shell below said inlet space for driving said shaft; an impeller on the shaft between said inlet and outlet spaces for moving fluid from said inlet space to said outlet space; a balancing disc fixed on said shaft below said inlet space, said balancing disc having a working face and a back face, said working face being directed away from said inlet space; an annular wall supported in said shell in a position facing said working face of said balancing disc; and walls forming a passage connecting said longitudinal opening of said shaft with the space between said balancing disc and said annular wall, said back space of said balancing disc being exposed to fluid pressure from said inlet space, so that pressure of fluid in said space between said balancing disc and said annular wall will hold said balancing disc in spaced relation to said annular wall.

9. A motor driven pump as defined in claim 8 wherein said passage includes a chamber below said motor and said opening extends from end of said shaft so that fluid from said outlet space is carried through said shaft to said chamber in the shell below said motor.

10. In an electric motor driven pump unit: a shell having bearings therein; a shaft supported in said bearings; a plate around said shaft at one end of said shell defining an internal chamber; a member secured to said plate and defining an impeller chamber having an axial inlet space and a peripheral outlet space; and a balancing disc mounted on said shaft in said internal chamber confronting said plate, there being wall means forming a passage connecting said outlet space with the space between said plate and said balancing disc, and said shaft having therein a longitudinal opening connecting said internal chamber with said inlet space.

11. In a motor driven pump unit: a shell having longitudinal bearings therein, a removable head at one end thereof and an impeller chamber at the opposite end thereof, said impeller chamber having an inlet space and an outlet space; a shaft in said bearings, said shaft having an opening from end-to-end thereof; an impeller on said shaft in said impeller chamber for moving fluid from said inlet space to said outlet space; a balancing disc on the opposite end of said shaft; a motor in said shell drivingly connected to said shaft between the ends thereof; and an annular wall member confronting the inner face of said balancing disc, there being passage means within said shell connecting said outlet space with the space between said annular wall and said balancing disc, said shell providing a passage connecting the space between said annular wall and said balancing disc with said opening through said shaft, whereby leakage fluid will be carried through said shaft from the space between said annular wall and said balancing disc to the inlet space of said impeller chamber.

12. In an electric motor driven pump adapted to be connected to the lower end of a discharge pipe: a shell arranged to be connected to the lower end of said pipe, said shell having bearings therein, an outlet space connected to the lower end of said pipe and an inlet space below said outlet space communicating with the exterior of said shell; a motor in said shell below said inlet space; a shaft extending in said bearings and being driven by said motor, said shaft having a longitudinal opening communicating with said outlet space and with the interior of said shell adjacent an end of said motor; an impeller on the shaft between said inlet and outlet spaces for moving fluid from said inlet space to said outlet space; a balancing disc fixed on said shaft below said inlet space, said balancing disc having a working face and a back face, said working face being directed away from said inlet space; an annular wall supported in said shell in a position facing said working face of said balancing disc; and walls forming a passage connecting said longitudinal opening of said shaft with the space between said balancing disc and said annular wall, said back space of said balancing disc being exposed to fluid pressure from said inlet space, so that pressure of fluid in said space between said balancing disc and said annular wall will hold said balancing disc in spaced relation to said annular wall, a portion of said passage extending through said motor so that it will be cooled by fluid which flows from said shaft opening to said space between said balancing disc and said annular wall.

References Cited in the file of this patent

UNITED STATES PATENTS

| 1,105,807 | Macneill | Aug. 4, 1914 |
| 2,669,187 | Gunzer | Feb. 16, 1954 |

FOREIGN PATENTS

| 107,208 | Austria | Sept. 10, 1927 |